United States Patent [19]

Rowland

[11] Patent Number: 4,892,771
[45] Date of Patent: Jan. 9, 1990

[54] THERMAL INSULATION BLANKET FOR A HOT WATER HEATER

[76] Inventor: David F. Rowland, 1148 Meadowcroft La., Mt. Pleasant, S.C. 29464

[21] Appl. No.: 176,465
[22] Filed: Apr. 1, 1988
[51] Int. Cl.$^4$ .............................................. B32B 1/04
[52] U.S. Cl. ........................................ 428/74; 428/76; 428/102; 428/192; 428/285; 428/286; 428/920
[58] Field of Search ................... 428/74, 76, 920, 225, 428/285, 286, 192; 138/149; 200/400, 403, 404, DIG. 9; 126/344

[56] References Cited

U.S. PATENT DOCUMENTS

| | | | |
|---|---|---|---|
| 2,768,420 | 10/1956 | Runton | 428/74 |
| 3,020,183 | 2/1962 | Calvaresi | 428/74 |
| 3,420,022 | 1/1969 | Brock | 428/76 |
| 3,941,159 | 3/1976 | Toll | 428/920 |
| 4,210,070 | 7/1980 | Tatum et al. | 428/920 |
| 4,442,585 | 4/1984 | McGehee et al. | 138/149 |
| 4,590,714 | 5/1986 | Walker | 428/74 |
| 4,726,974 | 2/1988 | Nowobilski | 428/74 |

*Primary Examiner*—Paul J. Thibodeau
*Attorney, Agent, or Firm*—B. Craig Killough

[57] ABSTRACT

This invention is an insulation device and material comprising fiberglass covered or sandwiched between polyethylene or woven polyethylene. The invention as disclosed herein has superior insulative characteristics over and above the use of fiberglass alone or fiberglass covered by paper, foil or plastic materials commonly found in the prior art. The invention is particularly well suited to the insulation of liquid containing vessels and conveyance means, such as water heaters and pipes.

3 Claims, 1 Drawing Sheet

THERMAL INSULATION BLANKET FOR A HOT WATER HEATER

BACKGROUND AND SUMMARY OF THE INVENTION

This invention relates generally to insulation devices and methods, and is more particularly directed to a device and method for insulating containers for heated liquids, including water heaters, and for insulating means for conveying such liquids, such as pipes.

Containers and vessels for heated liquids must be insulated to prevent heat loss. Failure to insulate results in great expense due to the transfer of heat energy into the surrounding environs. This is a situation which is commonly experienced, even resulting at the home-owner level with hot water heaters.

Insulation materials and devices for insulating water heaters, hot water pipes, and other containers and carrier means for the heating, storing and conveyance of heated water and other liquids are well known. In the past, devices for insulating hot water heaters, pipes, boilers and the like were made of asbestos, but due to health problems associated with asbestos, fiberglass is now used as the preferred material for insulation. Fiberglass, which is non-flammable and has good insulative characteristics, has been configured so as to be used for insulative wraps for pipes, for water heaters, and for other vessels and carrier means relating to hot water.

Fiberglass insulation is normally shredded, or strands of, fiberglass. The nature of this material is that it will not hold a shape by itself, and further, is hazardous and uncomfortable when it comes into contact with human skin. Accordingly, fiberglass insulation is usually covered on the outer layer with some other material. In the prior art, this mateial has typically been paper, plastic or foil.

The present invention incorporates fiberglass, but offers an improvement over fiberglass alone or as used in the prior art. Briefly, the present invention employs fiberglass insulation sandwiched between two layers, or outer skins, of woven polyethylene. The inventor believes that he is the first to place fiberglass between layers of polyethylene, which has given unexpected results in vastly superior insulative qualities over the use of fiberglass alone or fiberglass contained between paper, plastic or foil as is commonly in use. Further, woven polyethylene with nylon reinforcement impregnated therein is vastly superior to paper, plastic or foil or other materials used to cover or contain fiberglass in that it is extremely resistant to tears, abrasions, and water damage. Still further, polyethylene, particularly when used with nylon reinforcement impregnated therein, has excellent shape retention characteristics over the use of paper, plastic or foil used to cover fiberglass. Accordingly, when the fiberglass covered with woven polyethylene is shaped, such as in the shape of a hot water heater or other vessel so as to provide maximum insulation over a long period of use. Fiberglass which is only covered by paper, plastic or foil tends to lose its shape and to sag, tear, deteriorate, or even to start to fall off of the container or vessel, resulting in inferior insulative properties.

DETAILED DESCRIPTION OF THE DRAWINGS

DETAILED DESCRIPTION OF THE PREFERRED EMBODIMENT

The present invention incorporates fiberglass insulation which is contained between two layers, or outer skins, of woven polyethylene. This woven polyethylene may contain nylon reinforcement impregnated therein.

The material of the present invention may be configured so as to be easily applied over devices for heating liquids or containers or vessels holding liquids, such as hot water heaters, and may further be used as a wrap or cover for insulting pipes and similar liquid conveyance means.

Figure 1:
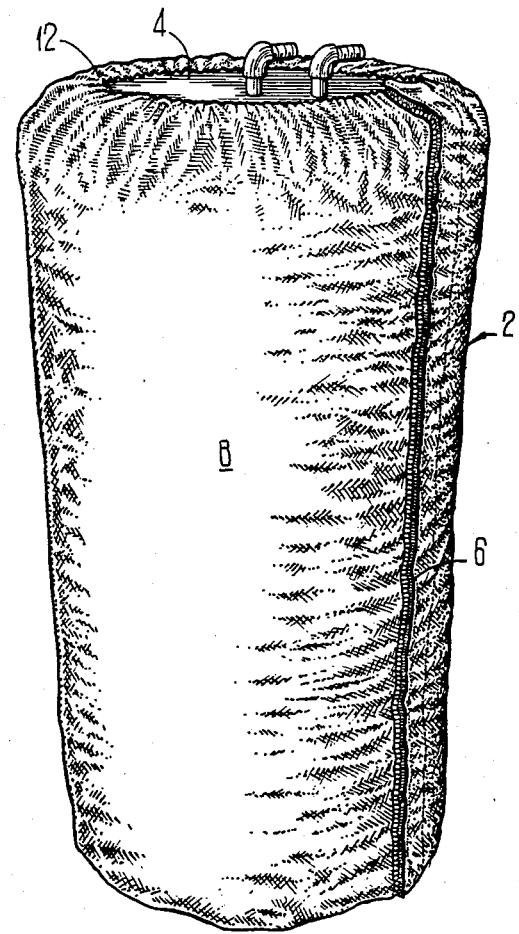
FIG. 1 is a perspective view of the present invention formed in the shape of a hot water heater and covering a hot water heater.

The most common application for the material of the present invention may be hot water heaters. FIG. 1 shows the material of the present invention configures so as to be used as a cover 2 for a hot water heater 4. The cover 2 is formed so as to be able to wrap around the water heater 4, being configureed so as to be of the proper height and length to be tightly wrapped around the hot water heater 4. The cover 2 may be connected or closed by various means, including a zipper or hook and loop material 6.

This material can be configured so as to wrap other containers or to be placed as a wrap over pipes. The particular configuration will depend on the shape and design of the device to be covered, and may be accordingly constructed by commonly known means.

Figure 2:
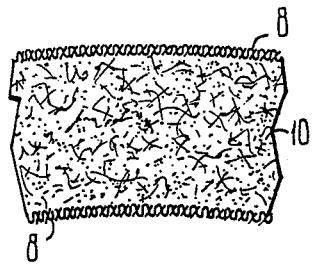
FIG. 2 is an isolated cross-section of the fiberglass contained between two layers of polyethylene.

FIG. 2 shows a cross-section of the polyethylene 8 and fiberglass 10 material. A center core of fiberglass 10 is used, and an outer skin of polyethylene 8 contains the fiberglass. The fiberglass is packed into the outer polyethylene skins which have been sewn together about their perimeters.

Woven polyethylene is selected due to its superior tear and abrasion resistant qualities, its resistance to fire, and due to the fact that it retains its shape when formed as a cover. While fiberglass strands have long been used as an insualtion material, such fiberglass has a tendency to lose its shape, to tear easily, and to absorb water and foreign materials which cause it to lose its effectiveness. Accordingly, fiberglass insulation has been placed between layers or sheets of paper, plastic or foil so as to shield the fiberglass from formed materials and to aid it in holding its shape. However, the inventor has discovered that woven polyethylene is vastly superior to plastic or other materials in producing a material and device which will hold its shape while being resistent to wear, tear, water, abrasion and foreign substances.

However, an unexpected result has occurred with regard to insulation properties. While a typical hot water cover using 4" thick fiberglass covered by paper or plastic will have an insulative property of R8, when the same amount of fiberglass is used and is covered by woven polyethylene in the manner taught hereby, the resulting material will have an R value of 10. Energy loss from heat transfer is thereby radically reduced by use of the material which is the subject of this invention.

To construct a water heater cover as is shown in FIG. 1, a first layer of woven polyethylene is cut from a larger piece so as to be of a proper height for the water heater to be covered and to surround the circumference of the water heater, while fitting tightly around the water heater. A second layer of woven polyethylene of the same size is cut in like fashion from a larger portion of woven polyethylene. The two layers are then sewn together about the perimeters of the sheets. Fiberglass insulative material is then stuffed in between the two sheets of woven polyethylene. The insulative material may be stuffed either through an opening which is left along one edge of the perimeter of the sheets, or by splitting one of the two sheets so as to form an opening. If one of the sheets is split, the split may be closed, such as by the use of pressure sensitive tape, with the split turned to the inside of the cover when installed. Sufficient fiberglass insulative material should be placed between the polyethylene sheets to achieve a preferred desired thickness of about 4" for a water heater application. The insultive material should be uniform in thickness. A rope or line is pulled through the top edge of the cover, and a zipper or hook and loop (velcro) or other fastening means is attached to the edge of the polyethylene material where the edges are to be joined 6. The cover is then wrapped around the water heater and joined by means of the hook and loop material, zipper or other fastening means. The rope is then pulled tightly around the top 12, and each end of the rope is tied and tucked between the cover and the hot water heater.

It has been found that, due to the configuration of the tank within the water heater and the insulation which is included within most water heaters, that an insulative top for a hot water heater is not of great benefit. However, a top could be fashioned as taught herein.

What is claimed is:

1. A thermal insulation blanket for a hot water heater, comprising a fiberglass insulative material sandwiched between a first and a second layer of woven polyethylene, with said first layer of woven polyethylene attached to said second layer of woven polyethylene along all edges thereof, by sewing said edges together so as to eliminate air pockets or other gaps between said first layer and said second layer and within said insulative material, and so as to prevent said insulative material from being compressed by said first and said second layer, wherein the height of the blanket is slightly higher than the height of a hot water heater to be covered and the length of said blanket is approximately equal to the circumference of said water heater to be covered, wherein a means is provided for joining an edge of said blanket which meets an opposite edge of said blanket when the blanket is wrapped around said hot water heater along the length of said edge and said opposite edge, and wherein a line is provided through a top edge of said blanket to allow said edge to be pulled tightly against said water heater.

2. A thermal insulation blanket for a hot water heater, comprising a sheet of fiberglass insulative material sandwiched between a first and second layer of woven polyethylene, with said first layer of woven polyethylene attached to said second layer of woven polyethylene along all edges thereof, wherein the height of the thermal insulation blanket is slightly higher than the height of a hot water heater to be covered and the length of said blanket is approximately equal to the circumference of said water heater to be covered, and wherein a means is provided for joining an edge of said blanket which meets an opposite edge of said blanket when the blanket is wrapped around said hot water heater as provided along said edges, and wherein a line is provided through a channel formed in the top edge of said blanket to allow said top edge to be pulled tightly against said hot water heater.

3. A thermal insulation blanket for a hot water heater as described in claim 2, wherein said first sheet and said second sheet of woven polyethylene material are placed over said fiberglass insulative material so as to eliminate air pockets or other gaps between said first layer and said second layer and within said fiberglass insulative material and so as to prevent said fiberglass insulative material from being compressed by said first and second layer of woven polyethylene, and wherein the edges of said thermal insulation blanket are created by sewing said first sheet of woven polyethylene and said second sheet of said woven polyethylene together.

* * * * *